United States Patent
Takahashi et al.

(10) Patent No.: US 11,748,967 B2
(45) Date of Patent: Sep. 5, 2023

(54) VEHICLE EXTERIOR ENVIRONMENT RECOGNITION APPARATUS

(71) Applicant: SUBARU CORPORATION, Tokyo (JP)

(72) Inventors: Naoki Takahashi, Tokyo (JP); Yusuke Goto, Tokyo (JP); Yuki Katsuno, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 298 days.

(21) Appl. No.: 17/154,734

(22) Filed: Jan. 21, 2021

(65) Prior Publication Data

US 2021/0284151 A1    Sep. 16, 2021

(30) Foreign Application Priority Data

Mar. 11, 2020   (JP) .................................. 2020-041648

(51) Int. Cl.
*G06V 10/25*    (2022.01)
*B60W 30/14*    (2006.01)
(Continued)

(52) U.S. Cl.
CPC ........... *G06V 10/25* (2022.01); *B60W 30/146* (2013.01); *G06F 18/22* (2023.01); *G06V 10/774* (2022.01);
(Continued)

(58) Field of Classification Search
CPC ....... B60W 30/146; B60W 2554/4041; B60W 2554/4049; G06K 9/6215; G06V 20/56;
(Continued)

(56) References Cited

U.S. PATENT DOCUMENTS 6,404,484 B1 *  6/2002  Sogawa ................. G06T 7/593
                                                    348/E13.014
11,208,102 B2 * 12/2021  Jia ..................... B60W 50/0097
(Continued)

FOREIGN PATENT DOCUMENTS

JP        2008151659 A  *  7/2008
JP        2019-034664 A     3/2019

OTHER PUBLICATIONS

Translation of JP-2008151659-A retrieved from Espacenet on Jun. 2, 2023 (Year: 2023).*

*Primary Examiner* — Thomas Ingram
*Assistant Examiner* — Faris Asim Shaikh
(74) *Attorney, Agent, or Firm* — McDermott Will & Emery LLP (57) ABSTRACT

A vehicle exterior environment recognition apparatus includes a stereo speed derivation unit, a monocular speed derivation unit, a predicted speed derivation unit, a mixture ratio derivation unit, and an object speed derivation unit. The stereo speed derivation unit derives a stereo speed indicating a speed of a three-dimensional object extracted from a distance image derived from luminance images of two image-capturing units. The monocular speed derivation unit derives a monocular speed indicating a speed of the three-dimensional object extracted from the luminance image of one of the image-capturing units. The predicted speed derivation unit derives a predicted speed based on a past speed of the three-dimensional object. The mixture ratio derivation unit derives a mixture ratio of the stereo, monocular, and predicted speeds. The object speed derivation unit mixes the stereo, monocular, and predicted speeds at the mixture ratio, to derive an object speed.

6 Claims, 7 Drawing Sheets

| STEREO STATUS | IB VALUE | | | STEREO RELIABILITY VALUE |
|---|---|---|---|---|
| | MONOCULAR DISTANCE ≤ 50 m | 50 m < MONOCULAR DISTANCE ≤ 70 m | 70 m < MONOCULAR DISTANCE | |
| SUPER RELIABLE | 23 < | LINEAR INTERPOLATED VALUE < | 18 < | --- |
| RELIABLE | 17 < | LINEAR INTERPOLATED VALUE < | 12 < | 3 |
| STABLE | 14 < | LINEAR INTERPOLATED VALUE < | 9 < | 2 |
| MAYBE | 6 < | LINEAR INTERPOLATED VALUE < | 2 < | 1 |
| NON | ≤ 6 | LINEAR INTERPOLATED VALUE < | ≤ 2 | 0 |

*FOR "SUPER RELIABLE" CASE:
STEREO SPEED ASSUMES 100%, MONOCULAR SPEED 0%, AND PREDICTED SPEED 0%.

(51) Int. Cl.
*G06V 20/64* (2022.01)
*G06F 18/22* (2023.01)
*G06V 10/774* (2022.01)
*G06V 40/20* (2022.01)
*G06V 20/56* (2022.01)

(52) U.S. Cl.
CPC .............. *G06V 20/64* (2022.01); *G06V 40/20* (2022.01); *B60W 2554/4041* (2020.02); *B60W 2554/4049* (2020.02); *G06V 20/56* (2022.01)

(58) Field of Classification Search
CPC ...... G06V 20/64; G06V 10/774; G06V 10/25; G06V 40/20; G06V 10/16; G06T 1/00; H04N 5/2257; H04N 5/247; H04N 5/2351; H04N 5/351; H04N 13/133; G08B 13/1961
See application file for complete search history.

(56) References Cited

U.S. PATENT DOCUMENTS

| | | | |
|---|---|---|---|
| 2007/0109176 A1* | 5/2007 | Nakanishi | G01S 13/588 342/115 |
| 2012/0294481 A1* | 11/2012 | Kasaoki | G06V 20/58 382/199 |
| 2013/0223689 A1* | 8/2013 | Saito | G06T 7/593 382/104 |
| 2014/0236449 A1* | 8/2014 | Horn | B60W 30/16 701/96 |
| 2016/0005180 A1* | 1/2016 | Matono | G06T 7/593 348/47 |
| 2017/0098132 A1* | 4/2017 | Yokota | G06T 7/194 |
| 2019/0034741 A1* | 1/2019 | Kanno | G06V 20/58 |
| 2020/0183411 A1* | 6/2020 | Oba | B60W 50/14 |
| 2021/0197720 A1* | 7/2021 | Houston | G06N 3/045 |
| 2021/0261159 A1* | 8/2021 | Pazhayampallil | G01S 17/89 |
| 2021/0278523 A1* | 9/2021 | Urtasun | G01S 17/89 |

* cited by examiner

| STEREO STATUS | IB VALUE | | | STEREO RELIABILITY VALUE |
|---|---|---|---|---|
| | MONOCULAR DISTANCE ≤ 50 m | 50 m < MONOCULAR DISTANCE ≤ 70 m | 70 m < MONOCULAR DISTANCE | |
| SUPER RELIABLE | 23 < | LINEAR INTERPOLATED VALUE < | 18 < | ---- |
| RELIABLE | 17 < | LINEAR INTERPOLATED VALUE < | 12 < | 3 |
| STABLE | 14 < | LINEAR INTERPOLATED VALUE < | 9 < | 2 |
| MAYBE | 6 < | LINEAR INTERPOLATED VALUE < | 2 < | 1 |
| NON | ≤ 6 | LINEAR INTERPOLATED VALUE < | ≤ 2 | 0 |

*FOR "SUPER RELIABLE" CASE:
STEREO SPEED ASSUMES 100%, MONOCULAR SPEED 0%, AND PREDICTED SPEED 0%.

DAYTIME CASE

| MONOCULAR STATUS | IDENTIFICATION RATE | IDENTIFICATION SCORE AVERAGE | MONOCULAR RELIABILITY VALUE |
|---|---|---|---|
| RELIABLE | 0.74 < | 0.70 < | 3 |
| STABLE | 0.70 < | 0.61 < | 2 |
| MAYBE | 0.63 < | 0.55 < | 1 |
| NON | ≤ 0.63 | ≤ 0.55 | 0 |

FIG. 6A

NIGHTTIME CASE

| MONOCULAR STATUS | LAMP SCORE | LAMP DETECTION CONTINUATION FLAG | MONOCULAR RELIABILITY VALUE |
|---|---|---|---|
| RELIABLE | 80 < | ON | 3 |
| STABLE | 70 < | — | 2 |
| MAYBE | — | — | 1 |
| NON | ≤ 70 | — | 0 |

VEHICLE EXTERIOR ENVIRONMENT RECOGNITION APPARATUS

CROSS-REFERENCE TO RELATED APPLICATIONS

This application claims priority from Japanese Patent Application No. 2020-041648 filed on Mar. 11, 2020, the entire contents of which are hereby incorporated by reference.

BACKGROUND

The disclosure relates to a vehicle exterior environment recognition apparatus configured to derive a speed of a three-dimensional object captured.

Techniques have been known that include recognizing vehicle exterior environment with the use of images captured by two image-capturing units installed in a vehicle. The vehicle exterior environment to be recognized includes a speed of a three-dimensional object, e.g., a preceding vehicle, located in a traveling direction of an own vehicle. For example, reference is made to Japanese Unexamined Patent Application Publication No. 2019-34664.

SUMMARY

An aspect of the technology provides a vehicle exterior environment recognition apparatus including a stereo speed derivation unit, a monocular speed derivation unit, a predicted speed derivation unit, a mixture ratio derivation unit, and an object speed derivation unit. The stereo speed derivation unit is configured to derive a stereo speed. The stereo speed indicates a speed of a three-dimensional object extracted from a distance image. The distance image is derived from luminance images of two image-capturing units. The monocular speed derivation unit is configured to derive a monocular speed. The monocular speed indicates a speed of the three-dimensional object extracted from the luminance image of one of the image-capturing units. The predicted speed derivation unit is configured to derive a predicted speed. The predicted speed indicates a current speed of the three-dimensional object predicted on the basis of a past speed of the three-dimensional object. The mixture ratio derivation unit is configured to derive a mixture ratio of the stereo speed, the monocular speed, and the predicted speed. The object speed derivation unit is configured to mix the stereo speed, the monocular speed, and the predicted speed at the mixture ratio, to derive an object speed indicating a speed of the three-dimensional object.

An aspect of the technology provides a vehicle exterior environment recognition apparatus including circuitry. The circuitry is configured to derive a stereo speed. The stereo speed indicates a speed of a three-dimensional object extracted from a distance image. The distance image is derived from luminance images of two image-capturing units. The circuitry is configured to derive a monocular speed. The monocular speed indicates a speed of the three-dimensional object extracted from the luminance image of one of the image-capturing units. The circuitry is configured to derive a predicted speed. The predicted speed indicates a current speed of the three-dimensional object predicted on the basis of a past speed of the three-dimensional object. The circuitry is configured to derive a mixture ratio of the stereo speed, the monocular speed, and the predicted speed. The circuitry is configured to mix the stereo speed, the monocular speed, and the predicted speed at the mixture ratio, to derive an object speed indicating a speed of the three-dimensional object.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIGS. 2A and 2B are provided for description of a luminance image and a distance image.

FIGS. 4A and 4B are provided for description of a stereo reliability value.

FIGS. 5A and 5B are provided for description of an IB value.

FIGS. 6A and 6B are provided for description of a monocular reliability value.

DETAILED DESCRIPTION

Vehicle exterior environment recognition techniques using two image-capturing units includes deriving a distance image from luminance images captured by the respective image-capturing units. The distance image includes parallax information. On the basis of the distance image thus derived, a speed of a three-dimensional object is derived.

In a case with, for example, raindrops present on a detection region of either one of the image-capturing units, many pieces of erroneous parallax information may be possibly derived. With many pieces of erroneous parallax information derived, errors may possibly occur in the speed of the three-dimensional object. In some cases, the speed of the three-dimensional object to be derived may abruptly change. Thus, in a case where, for example, a cruise control is being carried out with the use of the speed of the three-dimensional object thus derived, there arises possibility of unintentional acceleration of an own vehicle, causing the own vehicle to come unexpectedly close to a preceding vehicle.

It is desirable to provide a vehicle exterior environment recognition apparatus that makes it possible to stably derive a speed of a three-dimensional object.

In the following, some embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, a dimension of each of the elements, a material of each of the elements, a ratio between the elements, relative positional relationship between the elements, and any other specific numerical value are illustrative only for easier understanding and not to be construed as limiting to the technology unless otherwise stated. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

Figure 1:
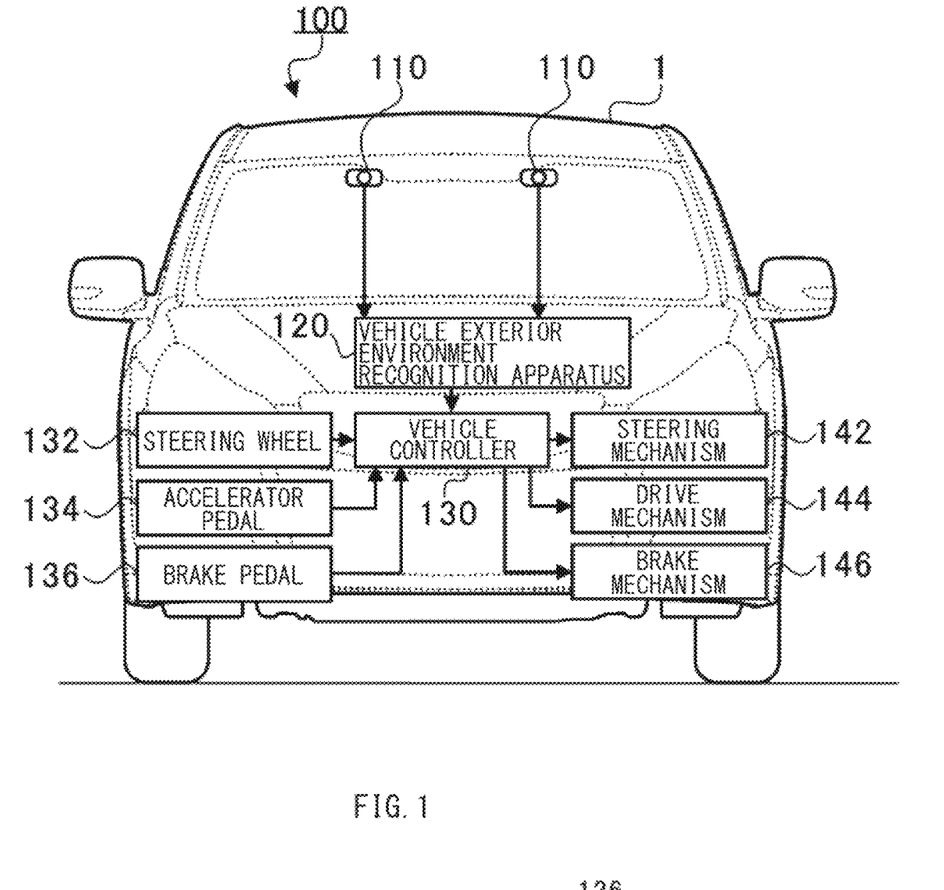
FIG. 1 is a block diagram illustrating a relation of connection in a vehicle exterior environment recognition system.

FIG. 1 is a block diagram illustrating a relation of connection in a vehicle exterior environment recognition system 100. The vehicle exterior environment recognition system 100 may include image-capturing units 110, a vehicle exterior environment recognition apparatus 120, and a vehicle controller 130. The vehicle controller 130 may include, for example, an electronic control unit (ECU). The embodiment may include an example with the two image-capturing units 110 without limitation.

The image-capturing units 110 may each include an imaging device such as, but not limited to, a charge-coupled device (CCD) and a complementary metal-oxide semiconductor (CMOS). The image-capturing units 110 may each capture an image of vehicle exterior environment ahead of an own vehicle 1, and generate a luminance image. The luminance image may include at least luminance information, and be provided in the form of a color image or a monochrome image. The two image-capturing units 110 may be so disposed that their respective optical axes become substantially parallel to each other along a traveling direction of the own vehicle 1. The two image-capturing units 110 may be so disposed as to be separated away from each other in a substantially horizontal direction. The image-capturing units 110 may continuously generate the luminance image for each frame of, for example but not limited to, 1/60 second (at a frame rate of 60 fps). The luminance image may include a capture of a three-dimensional object present in a detection region ahead of the own vehicle 1. The three-dimensional object to be recognized by the image-capturing units 110 refers to an object that is present independently, as well as an object identifiable as a part of the independently present object. Non-limiting examples of the independently present three-dimensional object may include a bicycle, a pedestrian, a vehicle, a traffic light, a road or a travel path, a road sign, a guardrail, and a building. Non-limiting examples of the object identifiable as a part of the independently present object may include a wheel of a bicycle.

The vehicle exterior environment recognition apparatus 120 may acquire the luminance image from each of the two image-capturing units 110, to derive the parallax information with the use of so-called pattern matching. The pattern matching includes searching one of the luminance images for a corresponding block to any block extracted from another of the luminance images. A block means, for example, an array of 4 pixels horizontally by 4 pixels vertically. The parallax information includes parallax, and an image position indicating where any block is positioned in an image. The term horizontal refers to a transverse direction in an image captured. The term vertical refers to a longitudinal direction in the image captured. The pattern matching may possibly include comparing a pair of images with respect to luminance (Y) in units of blocks. Non-limiting examples may include techniques such as, but not limited to, SAD (Sum of Absolute Difference), SSD (Sum of Squared intensity Difference), and NCC (Normalized Cross Correlation). The SAD includes obtaining a difference in the luminance. The SSD includes using the difference squared. The NCC includes obtaining a degree of similarity of a variance obtained by subtracting an average from luminance of each pixel. The vehicle exterior environment recognition apparatus 120 may perform such parallax derivation processing in units of blocks with respect to all blocks displayed in the detection region of, for example, 600 pixels by 200 pixels. Here, each block is assumed to include 4 pixels by 4 pixels, but the number of pixels in each block may be set at any value.

The vehicle exterior environment recognition apparatus 120 is configured to derive the parallax for each block as a unit of resolution of detection, but is not configured to recognize what three-dimensional object the relevant block is a part of. It follows, therefore, that the parallax information is derived not in units of three-dimensional objects but in units of the resolution of detection in the detection region, e.g., independently in units of blocks. Here, an image associated with the parallax information thus derived is called a "distance image", separately from the luminance image described above.

Figure 2A:
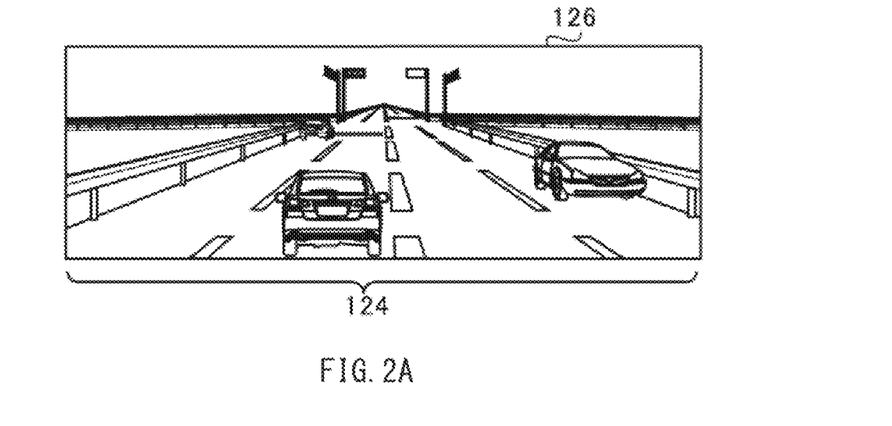
FIG. 2A illustrates an example of the luminance image.
Figure 2B:
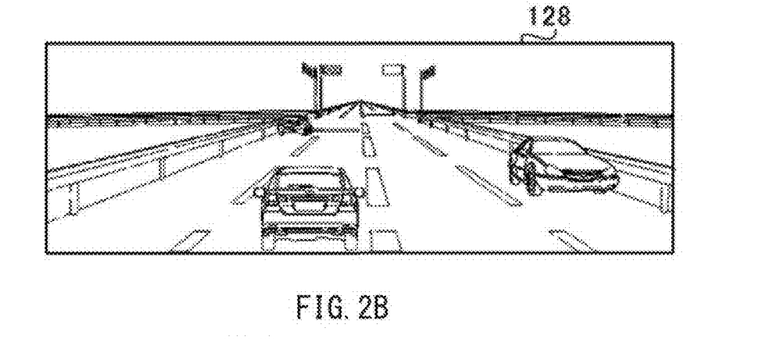
FIG. 2B illustrates an example of the distance image.

FIGS. 2A and 2B are provided for description of a luminance image 126 and a distance image 128. FIG. 2A illustrates an example of the luminance image 126. FIG. 2B illustrates an example of the distance image 128. For example, let us assume that the luminance image 126 as illustrated in FIG. 2A is generated with respect to a detection region 124 through the two image-capturing units 110. It is to be noted that, for purposes of easier understanding, FIG. 2A schematically illustrates one of the two luminance images 126. The vehicle exterior environment recognition apparatus 120 may obtain the parallax for each block from the luminance image 126, to form the distance image 128 as illustrated in FIG. 2B. Each block in the distance image 128 is associated with the parallax for the relevant block. In FIG. 2B, for purposes of description, the block for which the parallax is derived is represented by a black dot.

The vehicle exterior environment recognition apparatus 120 is configured to convert the parallax information in units of blocks in the distance image 182 into three-dimensional positional information with the use of a so-called stereo method, to derive a relative distance to the own vehicle 1 for each block. The stereo method is a method of deriving, from the parallax of an object, a relative distance to the image-capturing units 110 of the relevant object with the use of triangulation.

The vehicle exterior environment recognition apparatus 120 may perform grouping of blocks, as an object. The grouping may be made with the use of luminance values, i.e., color values, based on the luminance images 126, and with the use of the three-dimensional positional information in real space. The positional information may be calculated on the basis of the distance image 128, and include the relative distance to the own vehicle 1. The blocks to be grouped may have equal color values, and have the three-dimensional positional information indicating that the blocks are close to one another. Thereafter, the vehicle exterior environment recognition apparatus 120 may identify what kind of specific object, e.g., a preceding vehicle or a bicycle, the object in the detection region ahead of the own vehicle 1 corresponds to. In this way, the vehicle exterior environment recognition apparatus 120 may identify the three-dimensional object, and control the own vehicle 1, to avoid a collision with the three-dimensional object, i.e., a collision avoidance control, or to keep a safe inter-vehicular distance to the preceding vehicle, i.e., a cruise control.

The vehicle exterior environment recognition apparatus 120 may derive a speed of the three-dimensional object thus identified. With the use of the speed of the three-dimensional object thus derived, the vehicle exterior environment recognition apparatus 120 may carry out the collision avoidance control or the cruise control as mentioned above. In the following, the speed of the three-dimensional object to be derived by the vehicle exterior environment recognition apparatus 120 is also referred to as an "object speed".

As illustrated in FIG. 1, the vehicle controller 130 may receive an input of a driver's operation through a steering wheel 132, an accelerator pedal 134, and a brake pedal 136, and transmit the input to a steering mechanism 142, a drive mechanism 144, and a brake mechanism 146, to control the own vehicle 1. The vehicle controller 130 may control the steering mechanism 142, the drive mechanism 144, and the brake mechanism 146 in accordance with an instruction from the vehicle exterior environment recognition apparatus 120.

Figure 3:
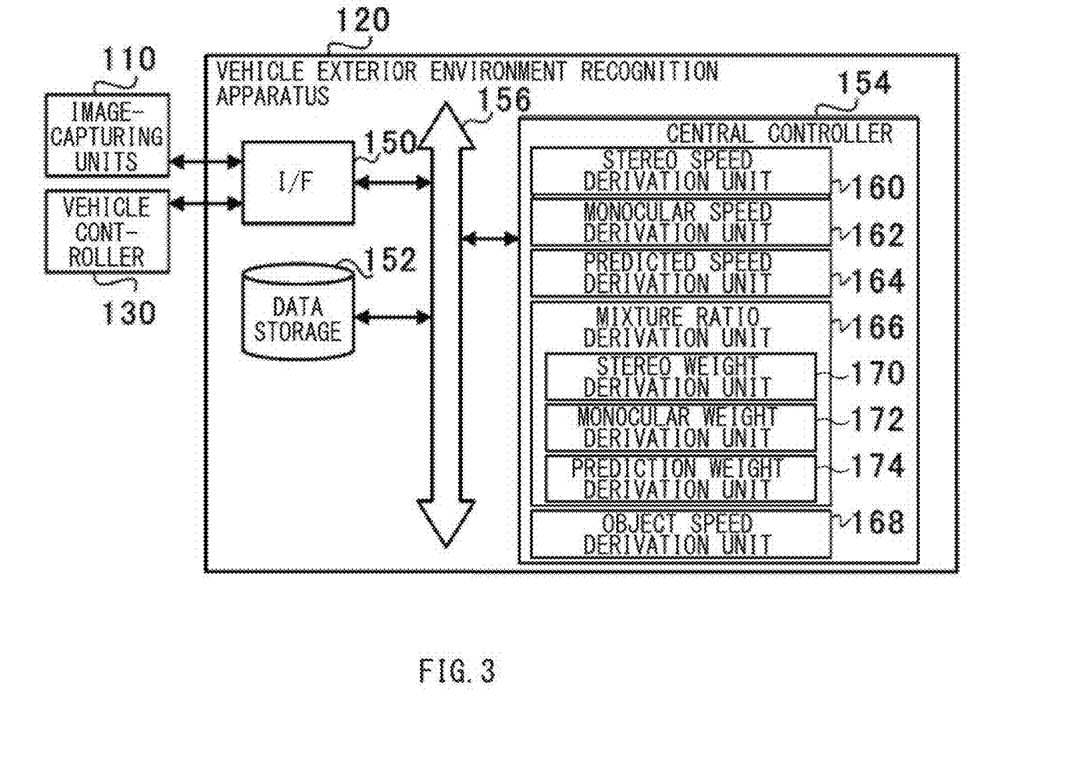
FIG. 3 is a block diagram illustrating, in outline, subunits of a vehicle exterior environment recognition apparatus.

FIG. 3 is a block diagram illustrating, in outline, subunits of the vehicle exterior environment recognition apparatus 120. As illustrated in FIG. 3, the vehicle exterior environment recognition apparatus 120 may include an I/F 150, a data storage 152, and a central controller 154.

The I/F 150 is an interface that carries out bi-directional information exchange with the image-capturing units 110 and the vehicle controller 130. The data storage 152 may include, for example, a RAM (Random Access Memory), a flash memory, and an HDD (Hard Disk Drive), and hold various pieces of information involved in processing by the subunits described below.

The central controller 154 may include a semiconductor integrated circuit including, for example, a CPU (Central Processing Unit), a ROM (Read Only Memory), and a RAM. The ROM may hold, for example, programs. The RAM may serve as a work area. The central controller 154 may control, for example, the I/F 150 and the data storage 152 through a system bus 156. In the embodiment, the central controller 154 may include a stereo speed derivation unit 160, a monocular speed derivation unit 162, a predicted speed derivation unit 164, a mixture ratio derivation unit 166, and an object speed derivation unit 168.

In the distance image, the parallax is derived in units of blocks, with respect to any block in which a degree of image matching between the luminance images 126 of the left and right image-capturing units 110 is equal to or higher than a threshold and becomes a maximum. In other words, in the distance image, with respect to any block in which the degree of image matching is lower than the threshold, the parallax is considered as underived.

In a state where both the left and right image-capturing units 110 have successfully captured clear images of the detection region 124, the degree of matching of the left and right luminance images 126 becomes higher. This makes it possible to actually derive the parallax with respect to many blocks in the distance image 128.

However, the presence of, for example, raindrops in the detection region 124 of the image-capturing unit 110 may cause the luminance image 126 to become a blurred image, i.e., an image that fails in clearly capturing a three-dimensional object. Thus, the presence of raindrops in the detection region 124 of any one of the left and right image-capturing units 110 may cause the lowered degree of matching of the left and right luminance images 126, and a decrease in the number of blocks in the distance image 128 for which the parallax is actually derived. An increase in the number of blocks for which the parallax has not been derived may cause difficulties in identifying a three-dimensional object from the distance image 128. This may result in hindrance to accurate derivation of the object speed of a three-dimensional object such as a preceding vehicle.

Thus, in a case where the number of blocks in the distance image 128 for which the parallax is actually derived becomes smaller than the predetermined number of blocks, the vehicle exterior environment recognition apparatus 120 may switch from a stereo control using a stereo distance to a monocular control using a monocular distance. The stereo control includes controlling the own vehicle 1 using at least the stereo distance. The stereo distance is the relative distance of the three-dimensional object extracted from the distance image 128. The monocular control includes controlling the own vehicle 1 using the monocular distance instead of the stereo distance. The monocular distance is the relative distance of the three-dimensional object extracted from the luminance image 126 of one of the image-capturing units 110.

Upon switching to the monocular control, the vehicle exterior environment recognition apparatus 120 may use the luminance image 126 of whichever of the left and right image-capturing units 110 has successfully performed relatively clearer imaging. For example, the vehicle exterior environment recognition apparatus 120 may use whichever of the luminance images 126 has generally higher luminance values.

For example, the vehicle exterior environment recognition apparatus 120 may derive an object frame from the luminance image 126 as a target of the monocular control. The object frame indicates a region occupied by a three-dimensional object as a target of derivation of the object speed, e.g., a preceding vehicle. The vehicle exterior environment recognition apparatus 120 may consider a change in a lateral width of the object frame as a change in the relative distance, and derive the object speed of the three-dimensional object, on the basis of the lateral width of the object frame before the predetermined number of frames (e.g., 100 frames) with respect to a current frame, and on the basis of a difference between the relative distance at that time and the lateral width of the current object frame. At the first time after the switching to the monocular control, the stereo distance immediately before the switching is employed instead of the relative distance at that time.

As described, in the vehicle exterior environment recognition apparatus 120, in the case where the luminance image 126 of one of the two image-capturing units 110 is blurred, the object speed may be derived solely with the use of the luminance image 126 of the other of the image-capturing units 110. This leads to suppression of lowered accuracy of the object speed to be derived.

However, immediately before the switching from the stereo control to the monocular control, although the number of blocks for which the parallax is successfully derived is greater than the predetermined number of blocks, the luminance image 126 is blurred by the presence of, for example, raindrops. This may sometimes cause the parallax of an erroneous value to be derived for each block. With the parallax of the erroneous values derived with respect to many blocks, the object speed of an erroneous value may be sometimes derived, in deriving the object speed based on the distance image 128.

With the object speed of the erroneous value derived, the vehicle exterior environment recognition apparatus 120 may possibly recognize that the object speed has changed abruptly. For example, although a three-dimensional object, e.g., a preceding vehicle, actually moves at a constant speed of about 80 km/h, the vehicle exterior environment recognition apparatus 120 may recognize that the three-dimensional object has accelerated rapidly from about 80 km/h to about 90 km/h. In such a case, carrying out the cruise control on the basis of the object speed derived may possibly cause the own vehicle 1 to accelerate unintentionally, to approach unexpectedly the preceding vehicle that is actually moving at the constant speed.

Thus, in the stereo control, the vehicle exterior environment recognition apparatus 120 of this embodiment may derive a speed of the three-dimensional object extracted from the luminance image 126 of one of the image-capturing units 110, and a current speed of the three-dimensional object predicted on the basis of a past speed of the three-dimensional object, in addition to the speed of the three-dimensional object extracted from the distance image 128.

In the following, the speed of the three-dimensional object extracted from the distance image 128 is also referred to as the stereo speed. The speed of the three-dimensional object extracted from the luminance image 126 of one of the image-capturing units 110 is also referred to as the monocular speed. The current speed of the three-dimensional object predicted on the basis of the past speed of the three-dimensional object is also referred to as a predicted speed.

Moreover, the predicted speed is assumed to be, for example, the object speed derived at previous timing of derivation of the object speed. That is, for the predicted speed, the past speed is used as the current speed.

In the past until predetermined time before the current time, in a case where an absolute value of a deceleration rate of the three-dimensional object is set to a predetermined value, e.g., 0.1 G, or more, the predicted speed may be derived in consideration of the deceleration. In other words, in this case, the predicted speed may assume a reduced value from the object speed at the previous timing of derivation.

In the stereo control, the vehicle exterior environment recognition apparatus 120 of this embodiment mixes the stereo speed, the monocular speed, and the predicted speed at an appropriate ratio, to derive the object speed of the three-dimensional object. In the following, processing of mixing the stereo speed, the monocular speed, and the predicted speed to derive the object speed is also referred to as speed correction processing.

The stereo speed derivation unit 160 in the vehicle exterior environment recognition apparatus 120 derives the stereo speed as mentioned above. The monocular speed derivation unit 162 derives the monocular speed as mentioned above. The predicted speed derivation unit 164 derives the predicted speed as mentioned above. The mixture ratio derivation unit 166 derives a mixture ratio of the stereo speed, the monocular speed, and the predicted speed. The object speed derivation unit 168 mixes the stereo speed, the monocular speed, and the predicted speed at the mixture ratio derived, to derive the object speed of the three-dimensional object.

In one example, the mixture ratio derivation unit 166 may include a stereo weight derivation unit 170, a monocular weight derivation unit 172, and a prediction weight derivation unit 174. The stereo weight derivation unit 170 may derive a stereo weight indicating a ratio of the stereo speed. The monocular weight derivation unit 172 may derive a monocular weight indicating a ratio of the monocular speed. The prediction weight derivation unit 174 may derive a prediction weight indicating a ratio of the predicted speed.

Here, the stereo speed is also denoted as Vs, the monocular speed as Vm, the predicted speed as Vp, the stereo weight as Ws, the monocular weight as Wm, the prediction weight as Wp, and the object speed as V. In one example, in the speed correction processing, the object speed derivation unit 168 may derive the object speed by the following expression (1).

$$V = (Ws \times Vs + Wm \times Vm + Wp \times Vp)/(Ws + Wm + Wp) \quad (1)$$

The stereo weight derivation unit 170 may derive the stereo weight in accordance with a reliability value of the distance image 128. In one example, the stereo weight derivation unit 170 may derive the stereo weight by the following expression (2).

$$Ws = (\text{stereo reliability value})^2 \quad (2)$$

Figure 4A:
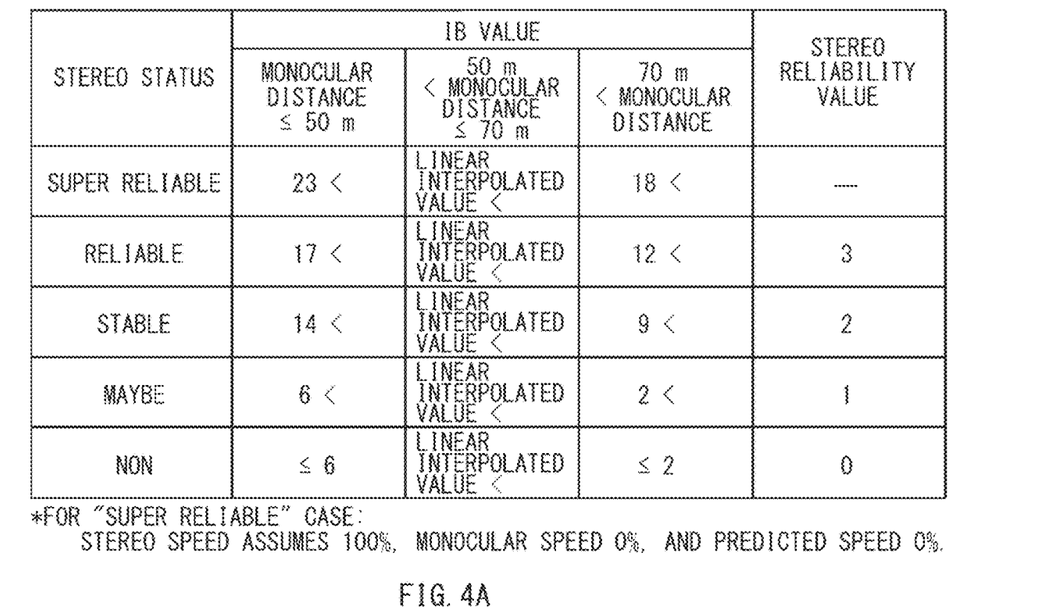
FIG. 4A is a table that summarizes a stereo status to be associated with the stereo reliability value.
Figure 4B:
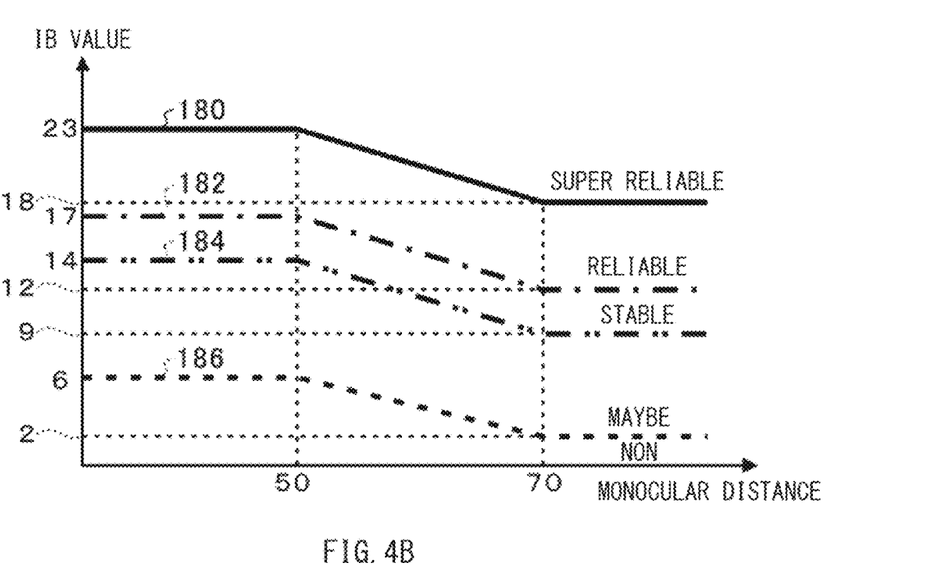
FIG. 4B is a graph illustrating the stereo status.

FIGS. 4A and 4B are provided for description of a stereo reliability value. FIG. 4A is a table that summarizes a stereo status to be associated with the stereo reliability value. FIG. 4B is a graph illustrating the stereo status.

As illustrated in FIG. 4A, the stereo reliability value may be set to, for example, four-level values, e.g., "0", "1", "2", and "3". As the stereo reliability takes a greater value, the stereo reliability value indicates that the distance image 128 has higher reliability. Moreover, the stereo reliability value is associated with the stereo status.

The stereo status is an index representing how high the reliability of the distance image 128 is. The stereo status may be set to, for example, five levels, e.g., "super reliable", "reliable", "stable", "maybe", and "non". The stereo status "reliable" is associated with the stereo reliability value "3". The stereo status "stable" is associated with the stereo reliability value "2". The stereo status "maybe" is associated with the stereo reliability value "1". The stereo status "non" is associated with the stereo reliability value "0". That is, the stereo status "reliable" represents higher reliability than the stereo status "stable". The stereo status "stable" represents higher reliability than the stereo status "maybe". The stereo status "maybe" represents higher reliability than the stereo status "non".

The stereo status "super reliable" is set to higher reliability than the stereo status "reliable". The stereo status "super reliable" is not associated with any stereo reliability value. However, the case of the stereo status "super reliable" may assume, as an exception, the mixture ratio of the stereo speed of 100%, the monocular speed of 0%, and the predicted speed of 0%. In other words, in the case of the stereo status "super reliable", as an exception, the object speed derivation unit 168 may set the stereo speed of the three-dimensional object as the object speed as it is.

A solid line 180 in FIG. 4B denotes a threshold that distinguishes the stereo status "super reliable" and "reliable". A long dashed short dashed line 182 denotes a threshold that distinguishes the stereo status "reliable" and "stable". A long dashed double-short dashed line 184 denotes a threshold that distinguishes the stereo status "stable" and "maybe". A dashed line 186 denotes a threshold that distinguishes the stereo status "maybe" and "non".

Figure 5A:
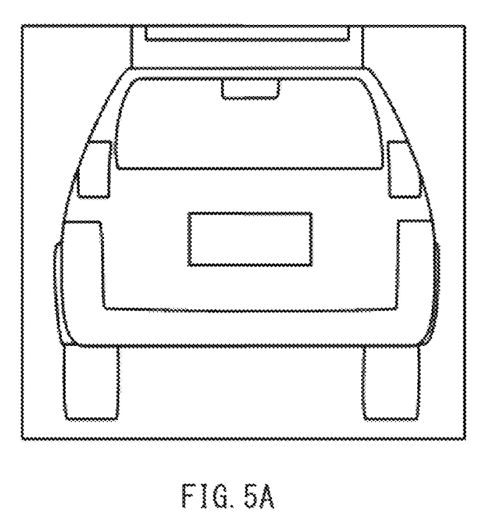
FIG. 5A illustrates an example of the luminance image.
Figure 5B:
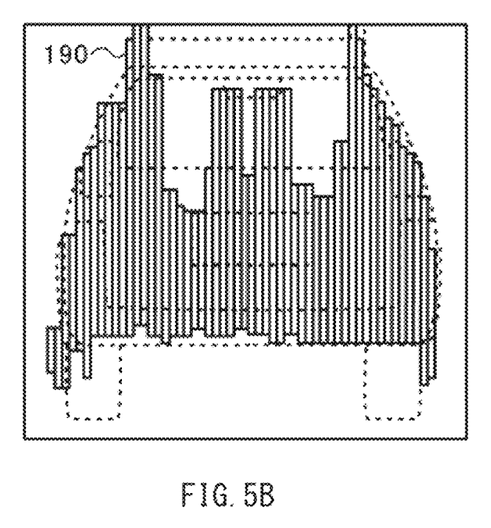
FIG. 5B illustrates an example of an image obtained by processing the distance image derived from the luminance image in FIG. 5A.

The stereo status may be determined on the basis of the monocular distance and an IB value. FIGS. 5A and 5B are provided for description of the IB value. FIG. 5A illustrates an example of the luminance image 126. FIG. 5B illustrates an example of an image obtained by processing the distance image 128 derived from the luminance image 126 of FIG. 5A. In the image of FIG. 5B, a plurality of bars 190 is displayed that extends in a vertical direction (height direction) of the image. The bars 190 are each formed by unitizing, from bottom toward top, successive blocks having substantially the same parallax (distance), as ascends along the blocks from a lower end of a three-dimensional object. Moreover, as to the bar 190, the blocks may be unitized in a case where the number of the successive blocks having substantially the same parallax (distance) is equal to or greater than a predetermined value. In a case where the number of the successive blocks is smaller than the predetermined value, the bar 190 does not have be formed. That is, area of the single bar 190 indicates a size of a region in which the parallax (distance) is substantially equal.

The IB value indicates the number of the bars 190. As the number of the blocks in the distance image 128 for which the parallax is derived increases, the IB value also tends to increase. Thus, as the IB value becomes greater, the reliability of the distance image 128 presumably becomes higher. That is, the IB value is an index indicating detection accuracy of a three-dimensional object in the distance image 128.

As illustrated in FIGS. 4A and 4B, the level of the stereo status may be determined on the basis of the IB value. As the IB value becomes greater, the stereo reliability value may be set to a greater value.

For example, in a case where the monocular distance is 50 meters or smaller, the setting may be provided as follows. In a case where the IB value is greater than 23, the stereo weight derivation unit 170 may set the stereo status to "super reliable". In a case where the IB value is greater than 17 and is equal to or smaller than 23, the stereo weight derivation unit 170 may set the stereo status to "reliable" and set the stereo reliability value to "3". In a case where the IB value is greater than 14 and is equal to or smaller than 17, the stereo weight derivation unit 170 may set the stereo status to "stable" and set the stereo reliability value to "2". In a case where the IB value is greater than 6 and is equal to or smaller than 14, the stereo weight derivation unit 170 may set the stereo status to "maybe" and set the stereo reliability value to "1". In a case where the IB value is equal to or smaller than 6, the stereo weight derivation unit 170 may set the stereo status to "non" and set the stereo reliability value to "0".

Moreover, for example, in a case where the monocular distance is greater than 70 meters, the setting may be provided as follows. In a case where the IB value is greater than 18, the stereo weight derivation unit 170 may set the stereo status as "super reliable". In a case where the IB value is greater than 12 and is equal to or smaller than 18, the stereo weight derivation unit 170 may set the stereo status to "reliable" and set the stereo reliability value to "3". In a case where the IB value is greater than 9 and is equal to or smaller than 12, the stereo weight derivation unit 170 may set the stereo status to "stable" and set the stereo reliability value to "2". In a case where the IB value is greater than 2 and is equal to or smaller than 9, the stereo weight derivation unit 170 may set the stereo status to "maybe" and set the stereo reliability value to "1". In a case where the IB value is equal to or smaller than 2, the stereo weight derivation unit 170 may set the stereo status to "non" and set the stereo reliability value to "0".

Furthermore, in a range where the monocular distance is greater than 50 meters and is equal to or smaller than 70 meters, as illustrated in FIG. 4B, linear interpolated values may serve as thresholds that distinguish the levels of the stereo status. The linear interpolated values may be obtained by linear interpolation between the thresholds of the IB value in the case where the monocular distance is 50 meters or smaller and the thresholds of the IB value in the case where the monocular distance is greater than 70 meters.

The parallax in the distance image 128 can be presumably derived with respect to more blocks, as the three-dimensional object is closer, i.e., as the monocular distance is smaller. In other words, as the monocular distance becomes smaller, the IB value presumably tends to become greater. Thus, as illustrated in FIGS. 4A and 4B, the thresholds of the IB value may be set to greater values as the monocular distance becomes smaller.

The stereo weight derivation unit 170 may also lower the stereo status by one level and lower the stereo reliability value by one, in a case where the stereo speed is less than 0.8 times the predicted speed or is greater than 1.3 times the predicted speed.

Description is given next of the monocular weight. The monocular weight derivation unit 172 may derive the monocular weight in accordance with the reliability value of the luminance image 126 of one of the image-capturing units. In one example, the monocular weight derivation unit 172 may derive the monocular weight by the following expression (3).

$$Wm = (\text{monocular reliability value})^2 \quad (3)$$

Figure 6A:
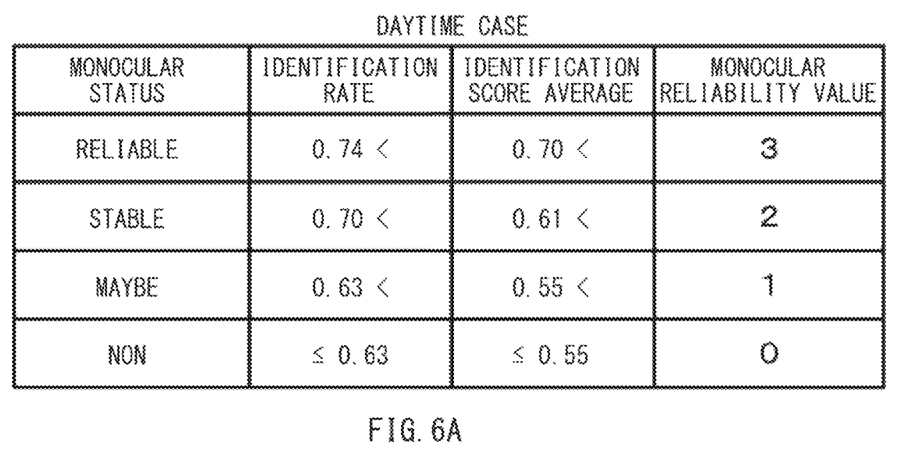
FIG. 6A summarizes a case where vehicle exterior environment of the own vehicle is daytime.
Figure 6B:
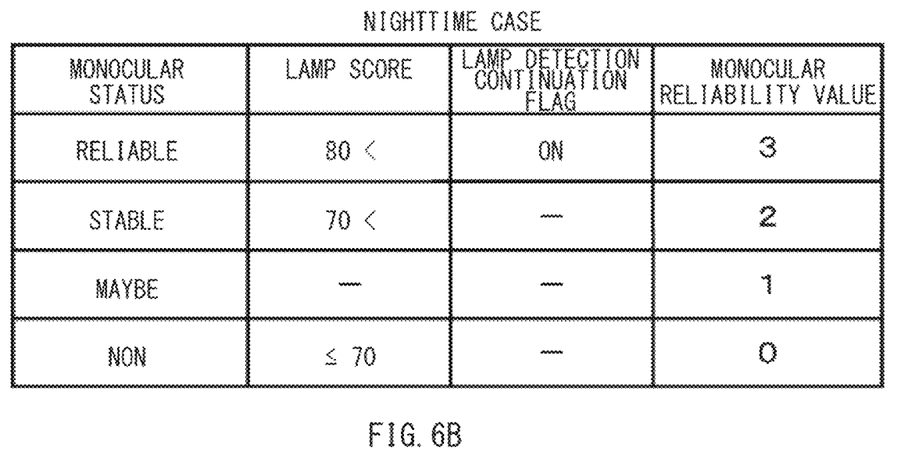
FIG. 6B summarizes a case where the vehicle exterior environment of the own vehicle is nighttime.

FIGS. 6A and 6B are provided for description of the monocular reliability value. FIG. 6A summarizes a daytime case where the vehicle exterior environment of the own vehicle 1 is daytime. FIG. 6B summarizes a nighttime case where the vehicle exterior environment of the own vehicle 1 is nighttime.

As illustrated in FIGS. 6A and 6B, the monocular reliability value may be set to, for example, four-level values, e.g., "0", "1", "2", and "3". As the monocular reliability value takes a greater value, the monocular reliability value indicates that the luminance image 126 has higher reliability. Moreover, the monocular reliability value is associated with a monocular status.

The monocular status is an index representing how high the reliability of the luminance image 126 is. The monocular status may be set to, for example, four levels, e.g., "reliable", "stable", "maybe", and "non". The monocular status "reliable" is associated with the monocular reliability value "3". The monocular status "stable" is associated with the monocular reliability value "2". The monocular status "maybe" is associated with the monocular reliability value "1". The monocular status "non" is associated with the monocular reliability value "0". That is, the monocular status "reliable" represents higher reliability than the monocular status "stable". The stereo status "stable" represents higher reliability than the monocular status "maybe". The monocular status "maybe" represents higher reliability than the monocular status "non".

As summarized in FIG. 6A, in the daytime case, the monocular status may be determined on the basis of an identification rate and an identification score. In contrast, as summarized in FIG. 6B, in the nighttime case, the monocular status may be determined on the basis of a lamp score and a lamp detection continuation flag.

Figure 7:
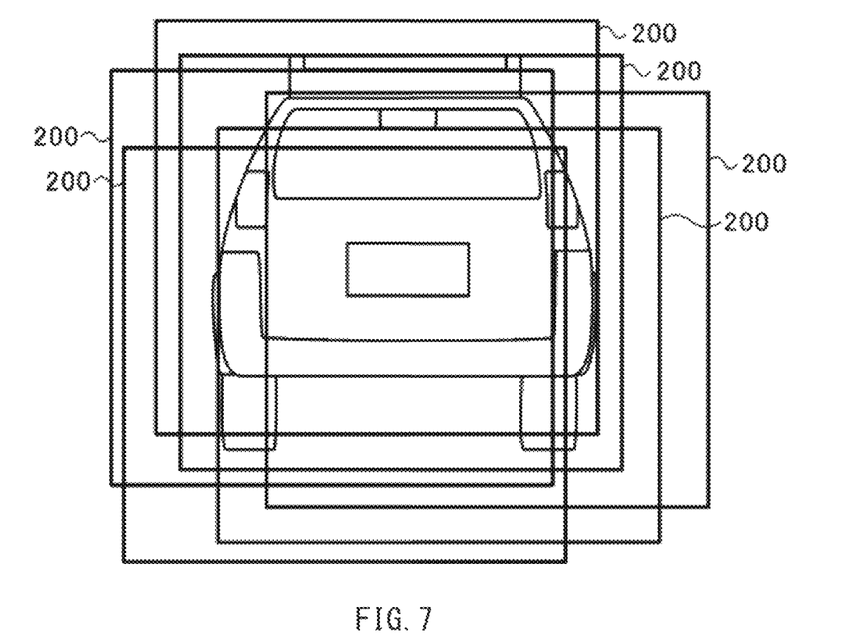
FIG. 7 is provided for description of an identification rate and an identification score.

FIG. 7 is provided for description of the identification rate and the identification score. As illustrated in FIG. 7, in a case where a target object is identified by the luminance image 126 of one of the image-capturing units 110, at least a portion of the target object is surrounded by a frame 200 of a predetermined size, to make an identification as to whether the target object in the frame 200 is a three-dimensional object to be identified, e.g., a preceding vehicle. In this identification, the frame 200 is randomly moved with respect to the target object. For each of the frames 200 at a plurality of positions, the identification is carried out as to whether or not the target object is the three-dimensional object to be identified. It is to be noted that the frame 200 may be formed to have a size that matches the three-dimensional object detected.

In the identification for each of the frames 200, a numerical value of three-dimensional-object-likeliness may be determined with respect to the target object in the frame 200, with the use of machine learning. The three-dimensional-object-likeliness indicates likeliness that the target object is the three-dimensional object to be identified. The identification score is the numerical value of the three-dimensional-object-likeliness. The identification score is normalized to take a value in a range from 0 to 1 both inclusive. As the identification score is closer to 1, the identification score indicates that the target object is more likely to be the three-dimensional object to be identified, e.g., a preceding vehicle. As the identification score is closer to 0, the identification score indicates that the target object is less likely to be the three-dimensional object to be identified. An identification score average is derived by averaging the identification score with the number of the frames 200, i.e., the number of times the identification score is derived.

Moreover, for each of the frames 200, in a case where the identification score is greater than 0.51, the target object in the frame 200 may be identified as being the three-dimensional object to be identified. In a case where the identification score is equal to or smaller than 0.51, the target object in the frame 200 may be identified as not being the three-dimensional object to be identified.

The identification rate indicates a ratio of the number of times the target object is identified as the three-dimensional object to be identified, to the number of the frames 200, i.e., the number of times the identification is carried out. As the identification rate becomes higher, probability is presumably high that the target object is the three-dimensional object to be identified.

As summarized in FIG. 6A, in the daytime case, as the identification rate and the identification rate average become higher, the monocular reliability value becomes higher. For example, in a case where the identification rate is greater than 0.74, and the identification score average is greater than 0.70, the monocular weight derivation unit 172 may set the monocular status to "reliable" and set the monocular reliability value to "3". In a case where the identification rate is greater than 0.70 and is equal to or smaller than 0.74, and the identification score average is greater than 0.61 and is equal to or smaller than 0.70, the monocular weight derivation unit 172 may set the monocular status to "stable" and set the monocular reliability value to "2". In a case where the identification rate is greater than 0.63 and is equal to or smaller than 0.70, and the identification score average is greater than 0.55 and is equal to or smaller than 0.61, the monocular weight derivation unit 172 may set the monocular status to "maybe" and the monocular reliability value to "1". In a case where the identification rate is equal to or smaller than 0.63, and the identification score average is equal to or smaller than 0.55, the monocular weight derivation unit 172 may set the monocular status to "non" and set the monocular reliability value to "0".

The monocular weight derivation unit 172 may lower the monocular status to "non" and lower the monocular reliability value to "0", in a case where the identification of the three-dimensional object has failed for a certain period of time, e.g., 0.5 second to 1.5 seconds both inclusive, in the daytime.

In a case where the identification rate and the identification score average suddenly decrease, a lost count may be carried out. The lost count indicates the number of times the identification is considered to have failed. In a case where the lost count is carried out the predetermined number of times or more in the daytime, the monocular weight derivation unit 172 may lower the monocular status by one level and lower the monocular reliability value by one.

Figure 8:
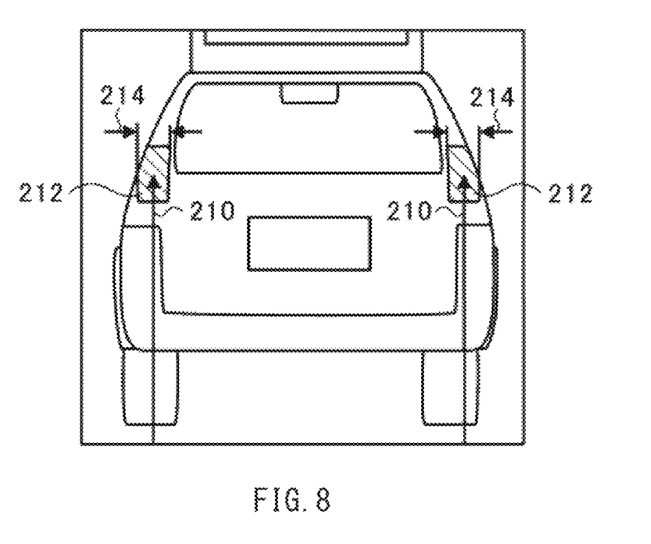
FIG. 8 is provided for description of a lamp score.

FIG. 8 is provided for description of the lamp score. In the nighttime case, a preceding vehicle lights left and right tail lamps. The lamp score is a scoring of features of the left and right tail lamps of the preceding vehicle.

Arrows 210 in FIG. 8 denote height positions of centers of the respective tail lamps in the luminance image 126. Hatched regions 212 in FIG. 8 denote area of the respective tail lamps. Arrows 214 in FIG. 8 denote lateral widths of the respective tail lamps. The lamp score is a sum of a degree of matching of the height positions of the centers of the tail lamps, a degree of matching of the area of the tail lamps, and a degree of matching of the lateral widths of the tail lamps in the set of the left and right tail lamps. The lamp score is adjusted to a value in a range from 0 to 100 both inclusive. For example, the lamp score is 100 in a case where the left and right tail lamps match with respect to all the forgoing items, i.e., the height positions of the centers, the area, and the lateral widths.

The lamp detection continuation flag indicates whether or not the tail lamps of the preceding vehicle are continuously detected. The lamp detection continuation flag is turned on in a case where the tail lamps have been continuously detected over the predetermined number of frames, e.g., 20 frames. Thereafter, the ON state is continued while the detection of the tail lamps is continued. The lamp detection continuation flag is turned off in a case where the detection of the tail lamps is interrupted.

As summarized in FIG. 6B, in the nighttime case, as the lamp score becomes higher and the lamp detection continuation flag is turned on, the monocular reliability value becomes higher. For example, in a case where the lamp score is greater than 80 and the lamp detection continuation flag is turned on, the monocular weight derivation unit 172 may set the monocular status to "reliable" and set the monocular reliability value to "3". Moreover, regardless of the lamp detection continuation flag, in a case where the lamp score is greater than 70 and is equal to or smaller than 80, the monocular weight derivation unit 172 may set the monocular status to "stable" and set the monocular reliability value to "2". Furthermore, regardless of the lamp detection continuation flag, in a case where the lamp score is equal to or smaller than 70, the monocular weight derivation unit 172 may set the monocular status to "non" and set the monocular reliability value to "0". The monocular status "maybe" may correspond to the monocular reliability value "1". The monocular status is set to "maybe" in a case where, for example, the monocular reliability value is lowered from "2" by one, or in a case where the monocular reliability value is raised from "0" by one.

The monocular weight derivation unit 172 may lower the monocular status by one level and lower the monocular reliability value by one, in a case where the monocular distance of the three-dimensional object, e.g., a preceding vehicle, is greater than 40 meters in the nighttime. This is to suppress the monocular weight from being erroneously too high because of the lamp score of the tail lamps located far away.

Moreover, the monocular weight derivation unit 172 may lower the monocular status by one level and lower the monocular reliability value by one, in a case where the monocular distance of the three-dimensional object is greater than 60 meters both in the daytime and in the nighttime. It is to be noted that, in the nighttime case, the monocular reliability value may be lowered by a total of two, on the basis of a combination of the forgoing conditions that the monocular distance is greater than 40 meters in the nighttime and that the monocular distance is greater than 60 meters both in the daytime and in the nighttime.

In addition, the monocular weight derivation unit 172 may lower the monocular status by one level and lower the monocular reliability value by one, in a case where a change in the monocular speed of the three-dimensional object indicates acceleration, both in the daytime and in the nighttime. This is to lower the monocular reliability value in consideration of a case with an erroneous determination that the three-dimensional object is accelerating, and to suppress erroneous acceleration of the own vehicle based on the increase in the monocular speed.

Moreover, the monocular weight derivation unit 172 may lower the monocular status by one level and lower the monocular reliability value by one, in a case where, both in the daytime and in the nighttime, the change in the monocular speed of the three-dimensional object indicates acceleration and a brake flag of a brake lamp identification module is turned on. The brake lamp identification module may determine whether or not the brake lamp of the preceding vehicle is lit. In a case where the brake lamp is lit, the brake lamp identification module may turn on the brake flag.

Further, with respect to the stereo reliability value described above, setting of an exception condition using the luminance image 126 of one of the image-capturing units 110 may be provided. For example, the stereo weight derivation unit 170 may acquire a ratio between the number of identifications on the right side and the number of identifications on the left side. The number of identifications on the right side means the number of times the target object in the frame 200 is identified as a three-dimensional object in the luminance image 126 on the right side. The number of identifications on the left side is the number of times the target object in the frame 200 is identified as a three-dimensional object in the luminance image 126 on the left side. The stereo weight derivation unit 170 may lower the stereo status by one level and lower the stereo reliability value by one, in a case where the level of the stereo status is "reliable" or lower and the ratio of the number of identifications on the right side and the number of identifications on the left side is lower than 0.9 (or 0.94 when the change in the monocular speed indicates acceleration). One reason may be as follows. In a case with a significant deviation between the number of identifications on the right side and the number of identifications on the left side, there may be presumably high possibility of the presence of, for example, raindrops in the detection region 124 of either one of the left and right image-capturing units 110.

In a case where the stereo status is "non" and the monocular status is "non", the stereo weight derivation unit 170 may increase the stereo reliability value by one. This is to prevent the object speed from being derived solely by the predicted speed.

Description now moves on to the prediction weight. The prediction weight derivation unit 174 may derive the prediction weight in accordance with an unreliability value of the distance image and an unreliability value of the luminance image of one of the image-capturing units. In one example, the prediction weight derivation unit 174 may derive the prediction weight by the following expression (4).

$$Wp=(\text{stereo unreliability value}) \times (\text{monocular unreliability value}) \quad (4)$$

In the following, the stereo reliability value is also represented as "Rs", a maximum value of the stereo reliability value as "Rsmax", and a stereo bias as "Bs". The prediction weight derivation unit 174 may derive the unreliability value by the following expression (5).

$$(\text{stereo unreliability value})=Rs\text{max}-\min(Rs\text{max},(Rs+Bs)) \quad (5)$$

In the expression (5), the term "min (Rsmax, (Rs+Bs))" indicates that whichever is smaller out of "Rsmax" and "(Rs+Bs)" is adopted. As the stereo reliability value "Rs", a value derived by the stereo weight derivation unit 170 is used. The maximum value "Rsmax" of the stereo reliability value is the stereo reliability value in a case where the stereo status is "reliable", for example, "3".

The stereo bias "Bs" is set to increase the stereo reliability value to be used in deriving the stereo unreliability value, and consequently reduce the stereo unreliability value. For example, the stereo bias may be set to "3" in a case where a change in the stereo speed of the three-dimensional object indicates deceleration and the three-dimensional object is at a short distance, i.e., the stereo distance is equal to or smaller than a predetermined value. The stereo bias may be set to "2" in a case where the change in the stereo speed of the three-dimensional object indicates deceleration and the three-dimensional object is not at a short distance, i.e., the stereo distance is greater than the predetermined value. The stereo bias may be set to "1" otherwise than the conditions on which the stereo bias is set to "3" or "2".

In the following, the monocular reliability value is also represented as "Rm", a maximum value of the monocular reliability value as "Rmmax", and a monocular bias as "Bm". The prediction weight derivation unit 174 may derive the monocular unreliability value by the following expression (6).

$$(\text{monocular unreliability value})=Rm\text{max}-\min(Rm\text{max},(Rm+Bm)) \quad (6)$$

In the expression (6), the term "min (Rmmax, (Rm+Bm))" indicates that whichever is smaller out of "Rmmax" and "(Rm+Bm)" is adopted. As the monocular reliability value "Rm", a value derived by the monocular weight derivation unit 172 is used. The maximum value "Rmmax" of the monocular reliability value is the monocular reliability value in a case where the monocular status is "reliable", for example, "3".

The monocular bias "Bm" is set to increase the monocular reliability value to be used in deriving the monocular unreliability value, and consequently reduce the monocular unreliability value. For example, the monocular bias may be set to "1" in a case where the change in the monocular speed of the three-dimensional object indicates deceleration. Otherwise than the condition, the monocular bias may be set to "0".

Setting the stereo bias or the monocular bias to "1" or greater makes it possible to lower the ratio of the prediction weight. This results in a decrease in the ratio of the predicted speed in the calculation of the object speed, making it possible to prevent excessive reduction in responsiveness to a time change in the object speed.

The object speed derivation unit 168 may apply the stereo weight derived by the expression (2), the monocular weight derived by the expression (3), and the prediction weight derived by the expression (4) to the expression (1) to derive the object speed.

In a case where the predetermined exception condition is established, the object speed derivation unit 168 may set the stereo speed of the three-dimensional object as the object speed, without mixing the stereo speed, the monocular speed, and the predicted speed, i.e., without performing the speed correction processing. The predetermined exception condition may be set by, for example, darkness around the own vehicle 1, the stereo distance, the stereo speed, the stereo status, or any combination thereof.

For example, the object speed derivation unit 168 may detect the darkness around the own vehicle 1. In a case where the darkness is equal to or higher than a level indicating the nighttime, the object speed derivation unit 168 may determine that the exception condition is satisfied, and set the stereo speed of the three-dimensional object as the object speed. This is to distinguish between a case where the luminance image 126 is blurred by, for example, raindrops and a case where the luminance image 126 is darkened in the nighttime.

In a case where the stereo distance is smaller than 20 meters or the stereo speed is lower than 45 km/h, the object speed derivation unit 168 may determine that the exception condition is satisfied, and set the stereo speed of the three-dimensional object as the object speed. This is to avoid a delay in a response to the time change in the object speed with respect to behavior of the three-dimensional object. Such a delay is possibly caused by carrying out the speed correction processing in a case with the presence of a three-dimensional object at a small distance.

Moreover, in a case where the stereo distance is equal to or greater than 20 meters and smaller than 25 meters (or the stereo distance is equal to or greater than 17 meters and smaller than 25 meters when it is determined that the three-dimensional object is accelerating) and the level of the stereo status is "stable" or higher, the object speed derivation unit 168 may determine that the exception condition is satisfied, and set the stereo speed of the three-dimensional object as the object speed. This is also to avoid the delay in the response of the object speed to be derived.

Furthermore, in a case where the stereo distance is equal to or greater than 70 meters, the object speed derivation unit 168 may determine that the exception condition is satisfied, and set the stereo speed of the three-dimensional object as the object speed. This is to suppress lowered accuracy of the object speed. Such lowered accuracy of the object speed is caused by fluctuation of the values of the monocular speed and the predicted speed in the case with the presence of the three-dimensional object far away.

Figure 9:
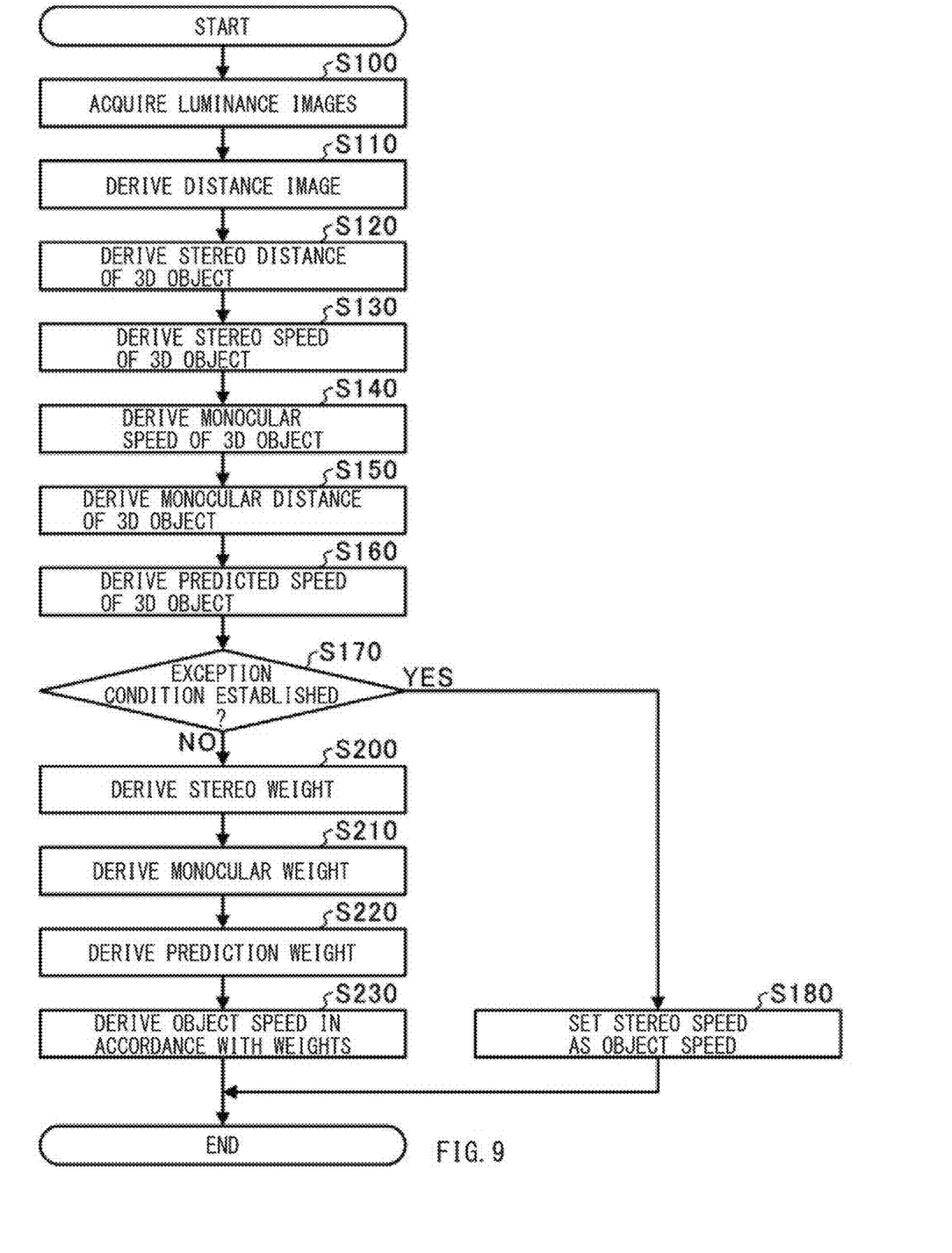
FIG. 9 is a flowchart illustrating a flow of operation of a central controller.

FIG. 9 is a flowchart illustrating a flow of operation of the central controller 154. The central controller 154 may repeat a series of processes illustrated in FIG. 9 at predetermined interrupt timing on predetermined control cycles. In the flowchart of FIG. 9, the flow of the operation related to the derivation of the object speed is described, and the description of operations unrelated to the derivation of the object speed is omitted.

First, the stereo speed derivation unit 160 may acquire the luminance image 126 from each of the left and right image-capturing units 110 (S100). Thereafter, the stereo speed derivation unit 160 may perform matching of the left and right luminance images 126 in units of blocks, to derive the distance image 128 including the parallax information (S110).

Thereafter, the stereo speed derivation unit 160 may identify a three-dimensional object, e.g., a preceding vehicle, on the basis of the distance image 128 and derive the stereo distance of the three-dimensional object (S120). Thereafter, the stereo speed derivation unit 160 may derive the stereo speed of the three-dimensional object on the basis of the stereo distance of the three-dimensional object (S130).

Thereafter, the monocular speed derivation unit 162 may derive the monocular speed of the three-dimensional object, using whichever captures the three-dimensional object more clearly, out of the left and right luminance images 126 acquired in step S100 (S140). For example, the monocular speed derivation unit 162 may use whichever of the luminance images 126 has generally higher luminance values. In one example, the monocular speed derivation unit 162 may derive the monocular speed on the basis of a change in a lateral width of the three-dimensional object in the luminance image 126 from a frame before the predetermined numbers of frames, e.g., before 100 frames, to the current frame. It is to be noted that the luminance image to be used in deriving the monocular speed may be fixed to either the luminance image of the left image-capturing unit 110 or the luminance image of the right image-capturing unit 110.

The monocular speed derivation unit 162 may integrate the derived monocular speed with time, to derive the monocular distance of the three-dimensional object (S150).

Thereafter, the predicted speed derivation unit 164 may derive the predicted speed of the three-dimensional object on the basis of the past speed of the three-dimensional object (S160). In one example, the predicted speed derivation unit 164 may set, as the current predicted speed, the object speed derived at previous interrupt timing, i.e., the interrupt timing before the predetermined number of the control cycles with respect to the current interrupt timing.

Thereafter, the object speed derivation unit 168 may determine whether or not the exception condition is established (S170). In a case where the exception condition is established (YES in S170), the object speed derivation unit 168 may set the stereo speed of the three-dimensional object derived in step S130 as the current object speed (S180) and terminate the series of processes.

In a case where the exception condition is not established (NO in S170), the flow may proceed to step S200 and subsequent processes. In one example, the stereo weight derivation unit 170 may derive the stereo weight (S200). Thereafter, the monocular weight derivation unit 172 may derive the monocular weight (S210). Thereafter, the prediction weight derivation unit 174 may derive the prediction weight (S220).

Thereafter, the object speed derivation unit 168 may derive the object speed in accordance with the stereo weight, the monocular weight, and the predicted weight thus derived (S230), and terminate the series of processes. In one example, the object speed derivation unit 168 may apply the stereo weight, the stereo speed, the monocular weight, the monocular speed, the prediction weight, and the predicted speed to the expression (1) to derive the object speed.

Although omitted in the flowchart of FIG. 9, in the case where the exception condition is established in the process of deriving the stereo weight, the monocular weight, or the prediction weight, the object speed derivation unit 168 may cause the flow to proceed to step S180 and set the stereo speed as the object speed.

Furthermore, although omitted in the flowchart of FIG. 9, in the case where the number of the blocks in the distance image 128 for which the parallax is derived is smaller than the predetermined number of blocks, the switching may be made from the stereo control to the monocular control. In the case with the switching to the monocular control, the object speed derivation unit 168 may set the monocular speed as the object speed.

As described above, in the vehicle exterior environment recognition apparatus 120 of this embodiment, in the stereo control, the stereo speed, the monocular speed, and the predicted speed are mixed at the appropriate mixing ratio to derive the object speed. Accordingly, in the vehicle exterior environment recognition apparatus 120 of this embodiment, in a case where the stereo speed has an error, it is possible to reduce the weighting of the stereo speed having the error, as compared with an example in which the object speed is derived solely from the stereo speed. Hence, in the vehicle exterior environment recognition apparatus 120 of this embodiment, it is possible to suppress an error of the object speed to be derived, even in the case with the presence of, for example, raindrops in the detection region 124 of one of the image-capturing units 110.

Thus, in the vehicle exterior environment recognition apparatus 120 of this embodiment, it is possible to stably derive the speed of the three-dimensional object. As a result, in the vehicle exterior environment recognition apparatus 120 of this embodiment, it is possible to stably perform, for example, the cruise control using the object speed.

Although some embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The vehicle exterior environment recognition apparatus 120 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle exterior environment recognition apparatus 120. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle exterior environment recognition apparatus 120 illustrated in FIG. 1.

The invention claimed is:

1. A vehicle exterior environment recognition apparatus included on an own vehicle, the vehicle exterior environment recognition apparatus comprising:
   a stereo speed derivation unit configured to derive a stereo speed, the stereo speed indicating a speed of a three-dimensional object extracted from a distance image, the distance image being derived from luminance images of two image-capturing units;
   a monocular speed derivation unit configured to derive a monocular speed, the monocular speed indicating a speed of the three-dimensional object extracted from the luminance image of one of the image-capturing units;
   a predicted speed derivation unit configured to derive a predicted speed, the predicted speed indicating a current speed of the three-dimensional object predicted on a basis of a past speed of the three-dimensional object;
   a mixture ratio derivation unit configured to derive a mixture ratio of the stereo speed, the monocular speed, and the predicted speed; and
   an object speed derivation unit configured to mix the stereo speed, the monocular speed, and the predicted speed at the mixture ratio, to derive an object speed indicating a speed of the three-dimensional object,
   wherein the mixture ratio derivation unit includes:
      a stereo weight derivation unit configured to derive a stereo weight indicating a ratio of the stereo speed;
      a monocular weight derivation unit configured to derive a monocular weight indicating a ratio of the monocular speed; and
      a prediction weight derivation unit configured to derive a prediction weight indicating a ratio of the predicted speed, and
   wherein the object speed derivation unit is configured to derive the object speed by an expression (1), $$V = (Ws \times Vs + Wm \times Vm + Wp \times Vp)/(Ws + Wm + Wp) \qquad (1)$$

where Vs denotes the stereo speed, Vm denotes the monocular speed, Vp denotes the predicted speed, Ws denotes the stereo weight, Wm denotes the monocular weight, Wp denotes the prediction weight, and V denotes the object speed,
   wherein the distance image comprises blocks that include first blocks from which parallax is derived and second blocks from which parallax is not derived,
   wherein the stereo weight derivation unit is configured to:
      obtain (1) a relative distance between the own vehicle and the three-dimensional object using the luminance image that is obtained from the one of the image-capturing units and that is used to obtain the distance image, and (2) a ratio of the first blocks having parallax to all of the blocks of the distance image;
      determine a reliability value of the distance image based on the relative distance and the ratio; and
      derive the stereo weight in accordance with the reliability value of the distance image.

2. The vehicle exterior environment recognition apparatus according to claim 1, wherein the monocular weight derivation unit is configured to:
   recognize the three-dimensional object or a part of three-dimensional object using the luminance image that is obtained from the one of the image-capturing units and that is used to obtain the distance image; and determine a reliability value of the luminance image based on a result of recognizing the three-dimensional object or a part of three-dimensional object; and derive the monocular weight in accordance with the reliability value of the luminance image of one of the image-capturing units.

3. The vehicle exterior environment recognition apparatus according to claim 2, wherein the prediction weight derivation unit is configured to:

obtain an unreliability value of the distance image using the reliability value of the distance image, and obtain an unreliability value of the luminance image using the reliability value of the luminance image; and derive the prediction weight in accordance with the unreliability value of the distance image and the unreliability value of the luminance image of one of the image-capturing units.

4. A vehicle exterior environment recognition apparatus included on an own vehicle, the vehicle exterior environment recognition apparatus comprising circuitry configured to:

derive a stereo speed, the stereo speed indicating a speed of a three-dimensional object extracted from a distance image, the distance image being derived from luminance images of two image-capturing units;

derive a monocular speed, the monocular speed indicating a speed of the three-dimensional object extracted from the luminance image of one of the image-capturing units;

derive a predicted speed, the predicted speed indicating a current speed of the three-dimensional object predicted on a basis of a past speed of the three-dimensional object;

derive a mixture ratio of the stereo speed, the monocular speed, and the predicted speed; and mix the stereo speed, the monocular speed, and the predicted speed at the mixture ratio, to derive an object speed indicating a speed of the three-dimensional object, the circuitry is further configured to:

derive a stereo weight indicating a ratio of the stereo speed;

derive a monocular weight indicating a ratio of the monocular speed; and derive a prediction weight indicating a ratio of the predicted speed, and derive the object speed by an expression (1), $$V=(Ws \times Vs+Wm \times Vm+Wp \times Vp)/(Ws+Wm+Wp) \qquad (1)$$

where Vs denotes the stereo speed, Vm denotes the monocular speed, Vp denotes the predicted speed, Ws denotes the stereo weight, Wm denotes the monocular weight, Wp denotes the prediction weight, and V denotes the object speed, wherein the distance image comprises blocks that include first blocks from which parallax is derived and second blocks from which parallax is not derived, wherein the circuitry is further configured to:

obtain (1) a relative distance between the own vehicle and the three-dimensional object using the luminance image that is obtained from the one of the image-capturing units and that is used to obtain the distance image, and (2) a ratio of the first blocks having parallax to all of the blocks of the distance image; and determine a reliability value of the distance image based on the relative distance and the ratio; and derive the stereo weight in accordance with the reliability value of the distance image.

5. The vehicle exterior environment recognition apparatus according to claim 4, wherein the circuitry is further configured to:

recognize the three-dimensional object or a part of three-dimensional object using the luminance image that is obtained from the one of the image-capturing units and that is used to obtain the distance image;

determine a reliability value of the luminance image based on a result of recognizing the three-dimensional object or a part of three-dimensional object; and derive the monocular weight in accordance with the reliability value of the luminance image of one of the image-capturing units.

6. The vehicle exterior environment recognition apparatus according to claim 5, wherein the circuitry is further configured to:

obtain an unreliability value of the distance image using the reliability value of the distance image, and obtain an unreliability value of the luminance image using the reliability value of the luminance image; and derive the prediction weight in accordance with the unreliability value of the distance image and the unreliability value of the luminance image of one of the image-capturing units.

* * * * *